US012561827B2

(12) United States Patent
Strunz et al.

(10) Patent No.: US 12,561,827 B2
(45) Date of Patent: Feb. 24, 2026

(54) METHOD, DEVICE AND COMPUTER PROGRAM FOR TRAINING AN ARTIFICIAL NEURAL NETWORK FOR OBJECT RECOGNITION IN IMAGES

(71) Applicant: BULL SAS, Les Clayes-sous-Bois (FR)

(72) Inventors: Eva Strunz, Delbrück (DE); Thomas Bierhoff, Paderborn (DE)

(73) Assignee: BULL SAS, Les Clayes-sous-Bois (FR)

( * ) Notice: Subject to any disclaimer, the term of this patent is extended or adjusted under 35 U.S.C. 154(b) by 316 days.

(21) Appl. No.: 18/326,144

(22) Filed: May 31, 2023

(65) Prior Publication Data

US 2023/0419532 A1 Dec. 28, 2023

(30) Foreign Application Priority Data

Jun. 27, 2022 (EP) .................................... 22305931

(51) Int. Cl.
*G06V 20/70* (2022.01)
*G06T 7/70* (2017.01)
(Continued)

(52) U.S. Cl.
CPC ................ *G06T 7/70* (2017.01); *G06V 10/44* (2022.01); *G06V 10/761* (2022.01); *G06V 20/70* (2022.01);
(Continued)

(58) Field of Classification Search
CPC ...... G06V 10/44; G06V 10/776; G06V 10/82; G06V 10/778; G06V 10/761; G06V 20/70; G06V 2201/07; G06N 3/042;

G06N 3/084; G06N 3/09; G06N 3/0464; G06N 3/045; G06T 7/70; G06T 2207/20081; G06T 2207/20084; G06F 18/217

See application file for complete search history.

(56) References Cited

PUBLICATIONS

Ma, Shiqing, et al. "MODE: automated neural network model debugging via state differential analysis and input selection." Proceedings of the 2018 26th ACM Joint Meeting on European Software Engineering Conference and Symposium on the Foundations of Software Engineering. 2018. (Year: 2018).*

(Continued)

*Primary Examiner* — Tracy Mangialaschi
(74) *Attorney, Agent, or Firm* — ARC IP Law, PC; Joseph J. Mayo

(57) ABSTRACT

The invention relates to a method for training an artificial neural network (ANN) for object detection in images. The method includes a training phase of training the ANN with a training database (TDB) that includes training images, and measuring a performance of the trained ANN with a validation database that includes validation images. If the measured performance is not satisfactory, the method further includes an enhancing phase of detecting a mismatch between the validation images and a response of the trained ANN in response to the validation images, correlating the mismatch to a characteristic of the training images that impacts the training of the ANN, modifying the training database according to the characteristic, and training the ANN with the modified training database. The invention further relates to a non-transitory computer program and a device configured to carry out the method, and to an artificial neural network trained with the method.

11 Claims, 2 Drawing Sheets

(51) Int. Cl.
  *G06V 10/44*　　　(2022.01)
  *G06V 10/74*　　　(2022.01)
(52) U.S. Cl.
  CPC .............. *G06T 2207/20081* (2013.01); *G06T 2207/20084* (2013.01); *G06V 2201/07* (2022.01)

(56)　　　　　References Cited

PUBLICATIONS

Wrenninge, Magnus, and Jonas Unger. "Synscapes: A photorealistic synthetic dataset for street scene parsing." arXiv preprint arXiv:1810.08705 (2018). (Year: 2018).*
Tian, Yongqiang, et al. "To what extent do dnn-based image classification models make unreliable inferences?. " Empirical Software Engineering 26.5 (2021): 84. (Year: 2021).*
European Search Report and Written Opinion issued in EP22305931.2 on Dec. 5, 2022 (9 pages).
Ma, et al., "Mode: automated neural network model debugging via state differential analysis and input selection", Proceedings of the 33$^{rd}$ ACM/IEEE International Conference on Automated Software Engineering (Oct. 26, 2018).
Wrenninge, et al., "Synscapes: A Photorealistic Synthetic Dataset for Street Scene Parsing", arxiv.org, Cornell University Library, 201 Olin Library Cornell University (Oct. 20, 2018).

* cited by examiner

100

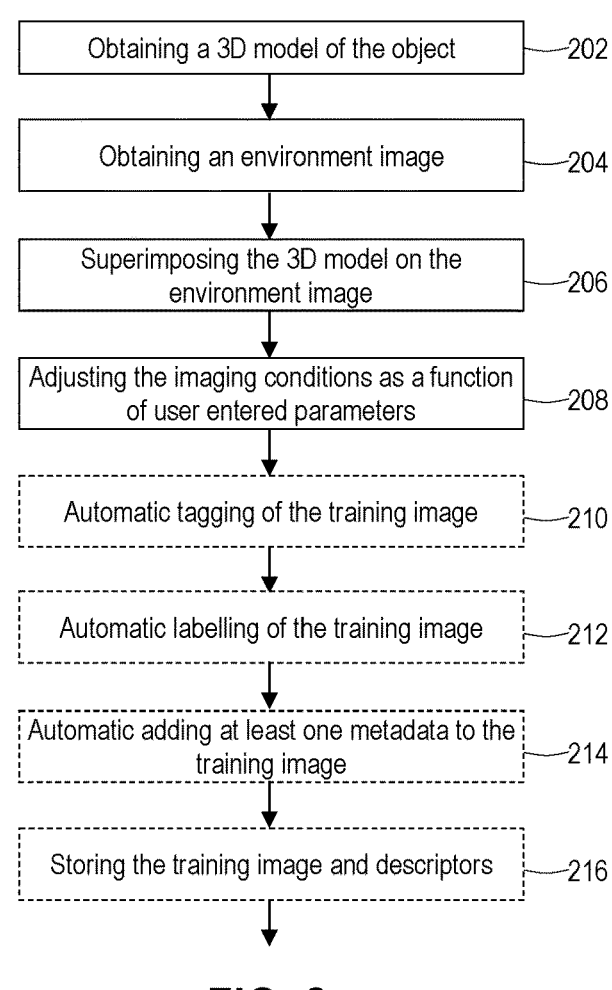

200

Obtaining a 3D model of the object —202

Obtaining an environment image —204

Superimposing the 3D model on the environment image —206

Adjusting the imaging conditions as a function of user entered parameters —208

Automatic tagging of the training image —210

Automatic labelling of the training image —212

Automatic adding at least one metadata to the training image —214

Storing the training image and descriptors —216

FIG. 2

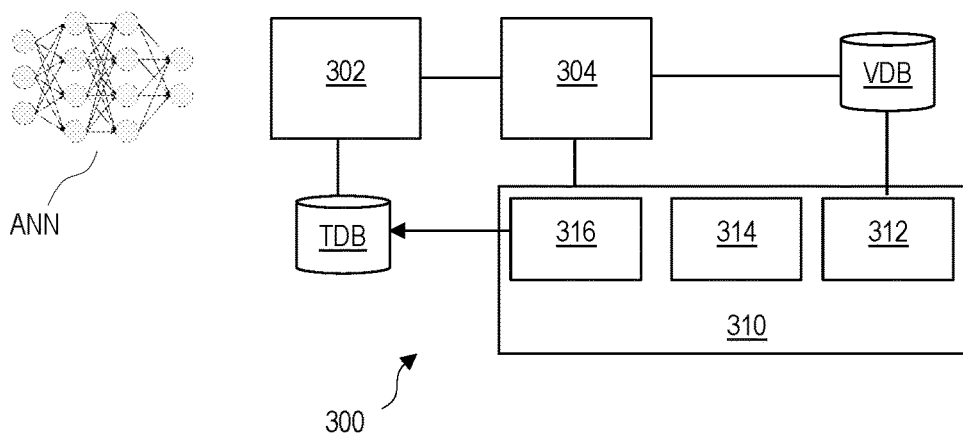

ANN 302    304    VDB

TDB    316    314    312

METHOD, DEVICE AND COMPUTER PROGRAM FOR TRAINING AN ARTIFICIAL NEURAL NETWORK FOR OBJECT RECOGNITION IN IMAGES

This application claims priority to European Patent Application Number 22305931.2, filed 27 Jun. 2022, the specification of which is hereby incorporated herein by reference.

BACKGROUND OF THE INVENTION

Field of the Invention

At least one embodiment of the invention relates to a computer implemented method for training an artificial neural network for object recognition in images. At least one embodiment of the invention also relates to a computer program and a device configured to carry out such a method. At least one embodiment of the invention also relates to an artificial neural network trained with such a method.

The field of the invention is the field of training an artificial neural network for object recognition in images, such as vehicles, humans, etc.

Description of the Related Art

Artificial neural networks used for object recognition in images are well known. The artificial neural network (ANN) is first trained during a training phase with training images. Then, the trained ANN is tested during a validation phase, with validation images, to determine whether the performance of the trained ANN is satisfactory. If the training is satisfactory, the ANN is then used for autonomous object recognition during an inference/prediction phase.

The training of an ANN requires a large amount of training data, for example several thousands of training images. The collection of the training images, for example by acquiring images of the objects, is time-consuming per se. Plus, if the training images need to be tagged and/or labelled, this amounts to a huge work that is much more time consuming. Moreover, for certain type of uncommon objects, there might not even exist enough images to train the ANN, which renders the use of an ANN impossible to recognize those objects in images.

Despite all efforts, even if a large amount of training images is available, the performance of the trained ANN may not be satisfactory. Then, the ANN is trained again and again, without information explaining why the training is/was not satisfactory. This amounts to impaired performance of the trained ANN even after several iterations of training the ANN, while the training process becomes more and more time-consuming and energy-intensive.

A purpose of at least one embodiment of the invention is to overcome at least one of these drawbacks.

Another purpose of at least one embodiment of the invention is to provide a less time and energy consuming solution for training an ANN for object detection in images.

Another purpose of at least one embodiment of the invention is to provide a solution for training an ANN for object detection in images, with better performance, precision and reliability.

Another purpose of at least one embodiment of the invention is to provide a solution for training an ANN for object detection in images, with better performance, while the training process is less time consuming and less energy-intensive compared to the current techniques.

BRIEF SUMMARY OF THE INVENTION

One or more embodiments of the invention makes it possible to achieve at least one of these aims by a computer implemented method for training an artificial neural network, ANN, for object detection in images, said method comprising a training phase comprising:

- training the ANN with a training database comprising several training images, and
- measuring a performance of the trained ANN with a validation database comprising several validation images;

if the measured performance is not satisfactory, at least one iteration of an enhancing phase comprising:

- detecting a mismatch between the validation images and a response of the trained ANN in response to said validation images,
- correlating the detected mismatch to at least one characteristic of the training images that impacts the training of the ANN,
- modifying the training database according to said at least one impacting characteristic, and
- training the ANN with said modified training database.

At least one embodiment of the invention thus proposes measuring the performance, i.e. the accuracy of the detection of objects, of the ANN after a first training. If the performance of the trained ANN is not satisfactory, i.e. below a predetermined threshold, this means that the training of the ANN is not satisfactory. In such a case, at least one embodiment of the invention proposes to determine why the training was not satisfactory, by determining in the training database at least one characteristic of the training images that leads to a poor performance of the trained ANN. In other words, at least one embodiment of the invention determines an explanation of the unsatisfactory training and a modification of the training database in order to improve the training of the ANN. Thus, one or more embodiments of the invention proposes a more efficient training of the ANN allowing a better performance of the ANN for a given training time, and/or a shorter training time for a given performance. Plus, at least one embodiment of the invention proposes a more efficient training allowing a better performance of the ANN while decreasing the overall training time taking into account all the training steps.

In one or more embodiments, the performance of the trained ANN is below a predetermined threshold if:

- the detection accuracy of the trained ANN is below a given threshold, and/or
- the number of the bounding boxes found by the trained ANN outside the corresponding real bounding boxes is above a given threshold.

Each training image shows an object to be detected by the ANN so that, when trained, the ANN may detect said object or objects of the same type.

When the ANN is trained to detect different types of objects, then each training image may be associated to at least one tag data, called tag, indicating the type of the object shown in said training image. For example, if the ANN is trained to detect land vehicles, the tag of the training image may be "bus", "car", "truck", etc., indicating the type of the land vehicle shown in the training image. If the ANN is trained to detect fruits, the tag of the training image may be "banana", "apple", "peach", etc., indicating the type of the fruit shown in the training image. This may be done during a tagging step of the image.

Moreover, in one or more embodiments, when the scale of the training image is larger than the size of the object to be detected in said training image, each training image may be associated to at least one label data, called label, indicating the location of the object in the training image. Generally, a label is a bounding box, in the training image, comprising the object to be detected. This may be done during a labelling step of the image.

Moreover, in one or more embodiments, at least one data, called metadata, may be associated to a training image giving information about:

an environment shown in the training image, for example regarding the weather, the daytime, the nature of the ground, etc.; and/or an imaging condition of the object to be detected in the training image, such as a distance between the object to be detected and an imaging point, an orientation of the object to be detected, etc.

In the following, "descriptor" designates all data associated to a training image, i.e. the tag(s), the label(s) and the metadata described above.

The same applies to the validation images. Each validation may comprise an object to be detected, and optionally may be associated to at least one tag and/or to at least one label and/or to at least one metadata, constituting the descriptor(s) of the validation image.

According to one or more embodiments, the training database may comprise at least one training image, called synthetic training image, obtained by simulation. The said synthetic image is not a real image captured by imaging means but an image generated in a simulated environment, for example by 3D simulation, using only simulated image components, or a combination of simulated component(s) and real image component(s).

An example of synthetic training image generation by simulation is described further below.

Alternatively, or in addition, by way of one or more embodiments, the training database may comprise at least one training image, called real training image, captured by imaging means, such as a camera. Said at least one real image may be a whole image captured by imaging means, or only a part of an image captured by imaging means.

According to one or more embodiments, the enhancing phase may be carried out once.

According to one or more embodiments, the enhancing phase may be carried out until the performance of the ANN is satisfactory, i.e. reaches or exceeds a given threshold.

According to one or more embodiments, for a validation image, a mismatch may be detected by comparing a label of said validation image to a feature detected in said validation image by a predetermined algorithm.

Such a mismatch detection may directly and efficiently show that the ANN detected an object in a wrong region of the validation image that does not comprise said object. For example, if the validation image shows the object with a sunny weather, the wrong region where the object is detected may correspond to a shadow, or a reflection, of the object to be detected.

According to one or more embodiments, the predetermined algorithm may be heatmap algorithm, or a gradient based algorithm.

Such algorithms may detect key features, such as for example object(s), in each validation image. In other words, such algorithms highlight the areas of the validation image which were used by the ANN to take the detection decision, i.e. the type of the object to be detected. The position of the key feature(s) detected in a validation image by the algorithm may then be compared to the label(s) of said validation image. If the position of the key feature does not correspond to the label of the validation image, it means that the ANN has detected the object in a wrong region in the validation image.

At least one characteristic of the training images that may impact the performance of the training of the ANN may be at least one characteristic of the object(s) to be detected in the training images. For example, in the training images, the object(s) may not be diverse enough in order for the training to be efficient.

Such a characteristic may be detected by analyzing the tags of the training images, for example by determining a count of the words appearing in the tags of all training images. If a specific word appears too frequently in the tags of the training images, that may mean that the training images are focused too much on a specific object, and other object(s) will not be detected efficiently.

For example, if the objects to be detected are "land vehicles", and if the word "bus" appears too frequently in the tags of the training images, this means that the training images are too focused on buses, and the training database should be modified to integrate images of other land vehicles, such as cars for example.

Alternatively, or in addition, by way of at least one embodiment, at least one characteristic of the training images that may impact the performance of the ANN may be a metadata, associated to said training images, and describing an environment, or an imaging condition, of the object to be detected in said training images.

Indeed, at least one impacting characteristic may be at least one characteristic of the environment, in the training images, of the object(s) to be detected. For example, in the training images, the object(s) to be detected may always be shown in winter with snow on the ground, or at noon, etc.

Such a characteristic may be detected by analyzing metadata, previously associated to training images, and describing the environment of the object(s) to be detected in the training images. For example, the analysis may comprise determining a count of the words appearing in the metadata of all training images. If a specific word appears too frequently in the metadata of the training images, that may mean that the training images are focused too much on a specific environment, and the detection in other environments will not be efficient For example, if the objects to be detected are "land vehicles", and if the word "snow" appears too frequently in the metadata of the training images, this means that the training images are too focused on land vehicles with snowy environment, and the training database should be modified to integrate images of land vehicles in other environment, such as vehicles imaged in an environment without snow.

Alternatively, or in addition, by way of at least one embodiment, at least one characteristic may be at least one characteristic of the imaging condition, in the training images, of the object(s) to be detected. For example, in the training images, the object(s) may be imaged according to the same, or similar, angle(s) of view, or with a too big distance, etc.

Such a characteristic may be detected by analyzing metadata previously associated to training images and describing the imaging condition(s) of the object(s) in the training images. For example, the analysis may comprise determining a count of the words appearing in the metadata relative to the imaging conditions. If a specific word appears too frequently in the metadata of the training images, that may mean that the training images are focused too much on a specific imaging condition.

For example, if the objects to be detected are "land vehicles", and if the word "top view" appears too frequently in the metadata of the training images, this means that the training images are too focused on showing the vehicles from the top, and the training database should be modified to integrate images of land vehicles in other point(s) of view, or orientation(s).

Alternatively, or in addition, by way of at least one embodiment, at least one characteristic impairing the performance of the ANN may be detected by comparing:

the descriptors of the validation images for which the ANN returned a correct detection, with the descriptors of the validation images for which the ANN returned a false detection.

The compared descriptors may comprise at least one of the tag(s), label(s) and metadata associated to the validation images. If a difference is identified frequently during the comparison, the said difference may explain the poor performance of the ANN and the training database may be modified accordingly.

For example, if the metadata "snowy" is associated to all of, or the majority of, the validation images for which the object detection was correct, and this metadata is absent for all of, or the majority of, the validation images for which the object detection was false, it means that the training database may probably need more training images with said metadata.

In one or more embodiments, the step of modifying the training database may comprise adding at least one new training image to said database.

At least one new training image added to the training database may be determined according to at least one impacting characteristic, such as at least one of the characteristics mentioned above.

For example, if the objects to be detected are "land vehicles", and if the impacting parameter is "snowy environment" then the new training image(s) shows land vehicle (s) in an environment that does not comprise snow.

At least one new training image may be a real image captured by imaging means, such as camera. Such an image may be collected from a database or from a camera.

At least one new training image may be an image obtained by simulation. In other words, at least one new training image may a be a synthetic image.

In this case, the method according to one or more embodiments of the invention may comprise a step for generating the new training image by simulation, and more particularly by 3D-simulation. Such image generation is well known.

The generation of a new simulated training image may comprise the following steps, in at least one embodiment, for at least one object to be detected:

first, a 3D model of the object is obtained. For example, the 3D model of the object may be read from a database where such a model is stored. As alternative, an object in the real world may be scanned with a camera, for example with a camera under a drone, and a 3D model renders of the object out of it, for example by photogrammetry. According to yet another example, the 3D model may be designed and created by an operator with a simulation application;

then 3D model is added to a source image showing a given environment. Such an image may be a real image captured with imaging means or a simulated environment;

optionally, the position and/or the orientation and/or the size of the object may be adjusted.

Thus with the 3D-model of the object it is possible to obtain several different training images.

If several source images are available, each showing different environments, it is possible to generate many training images, to build a training database in a very short time.

The method according to one or more embodiments of the invention may also comprise a step for automatically adding, to the new training image, a label indicating the location of an object to be detected in said new training image.

The automatic labelling of a training image may be done by using a segmentation image.

A segmentation image contains the object to be detected as a masked object that can be used for calculation of bounding boxes. For the masking, the texture of the object is changed to a highlighting color during image creation. As an alternative, in at least one embodiment, some simulators also provide a segmentation algorithm that colors each object of the scene (ground, sky, objects) in different colors. This is done on the camera stream. In this case, the texture of the object does not need to be modified.

In more detail for an original training image, which may be a real image captured by imaging means or an image obtained by 3D-simulation, the texture is changed and a capture of the masked object, i.e. the object to be detected is saved. The highlighting color for masking the object, for example pink, is used to analyze the segmentation image pixelwise. Then the segmentation image is analyzed in order to calculate the bounding box that includes all pink pixels. This bounding box is then applied to the original training image with the original texture.

If the new training image is generated by simulation using a 3D-model of the object superimposed to an environment image, the labelling of the training image is much easier because the position and the dimensions of the 3D-model are known and may be used to obtain the label.

The method according to one or more embodiments of the invention may also comprise a step for automatically adding, to the new training image, a tag indicating the type of the object to be detected.

When the new image is an image obtained by simulation, the tagging of this new image may be done by using the parameters used for the generation of the image, such as the type of the vehicle in the image when the ANN is used for vehicle detection in images.

When the new image is a real image, the tagging of this new image may be done manually.

In some cases, in at least one embodiment, the generalization of an ANN can be improved by adding a small amount of real data to the training dataset. To not label the images with human recognition capabilities, a semi-automatic labeling process with a custom trained ANN is applied. The pre-recognition of objects is done by a trained ANN on a dataset of similar synthetic images. After the capturing of synthetic images in a simulator, a set of images similar to the real images are used to train an ANN that recognizes the defined objects. These ANN is then applied to the real images. The resulting detections that are marked with bounding boxes are saved as label for the containing object. If the bounding box is not recognized or not precise enough, a human is able to correct it by hand.

The method according to one or more embodiments of the invention may also comprise a step for automatically adding, to the new training image, at least one metadata indicating additional information regarding:

an environment of the object to be detected in said new training image, for example weather condition, daytime, etc.; and/or an imaging condition of the object to be detected in said new training image, such as distance to the object in said image, the orientation of the object in same image, etc.

When the new image is an image obtained by simulation, at least one metadata may be obtained by using the parameters used for the generation of the image.

When the new image is a real image, at least one metadata may be obtained manually by a user observing said image.

According to one or more embodiments, the step of modifying the training database may comprise selecting a subset of said training database. In this case the next/further training of the ANN during the enhancing phase is done only with this subset of images.

A subset of the training images may be selected according to the tag(s) of the training images. For example, if the ANN is used for detecting vehicles in images, and the mismatches are mostly related to buses, this means that the ANN has not been trained enough with buses images.

Alternatively, or in addition, by way of at least one embodiment, a subset of the training images may be selected according to the metadata of the training images. For example, if the ANN is used for detecting vehicles in images, and the mismatches are mostly related to snowy weather conditions, this means that the ANN has not been trained enough with images showing vehicles in snowy weather condition.

Of course, the subset may be selected according to at least another parameter, alone or in combination with at least one of the tag(s) and/or the metadata associated to the training images.

The ANN may be any type of artificial neural network used for object detection in images, according to one or more embodiments.

For example, the ANN may be a Convolutional Neural Network, CNN.

For example, the ANN may be a Deep Learning Neural Network, DLNN.

More particularly, the ANN may be a Deep Learning Convolutional Neural Network DLCNN.

The ANN may be YOLOV5.

The ANN may have 191 layers. More generally, the ANN may have 50 to 200 layers.

The ANN may be trained according to any known training algorithm, such as a backpropagation algorithm, such as forward pass with back propagation.

The cost function may be any known cost function used for training an ANN for object detection such as a cosine distance, a linear distance, quadratic cost, etc. The layers of the ANN may be any known layers used for CNNs, such as convolutional layers, pooling layers, fully connected layers.

The architecture of the ANN may be any known ANN architecture, such as YOLO, EfficientNet or even a transformer architecture.

According to at least one embodiment of the invention, it is proposed a computer program comprising instructions, which when executed by a computer, cause the computer to carry out the steps of the method according to one or more embodiments of the invention for training an ANN for object detection in images.

The computer program may be in any programming language such as C, C++, JAVA, Python, etc.

The computer program may be in machine language.

The computer program may be stored, in a non-transient memory, such as a USB stick, a flash memory, a hard-disk, a processor, a programmable electronic chop, etc.

The computer program may be stored in a computerized device such as a Smartphone, a tablet, a computer, a server, etc.

According to at least one embodiment of the invention, it is proposed a device configured to carry out the steps of the method according to one or more embodiments of the invention for training an ANN for object detection in images.

The device may be any computerized device such as a Smartphone, a tablet, a computer, a server, a processor, etc.

The device according to one or more embodiments of the invention may execute one or several applications to carry out the steps of the method according to the invention.

The device according to one or more embodiments of the invention may be loaded with, and configured to execute, the computer program according to the invention.

BRIEF DESCRIPTION OF THE DRAWINGS

Other advantages and characteristics will become apparent on examination of the detailed description of an embodiment which is in no way limitative, and the attached figures, where:

FIG. 2 is a diagrammatic representation of a first non-limitative example of a method for generating a simulated image that may be used in one or more embodiments of the invention; and FIG. 3 is a diagrammatic representation of a non-limitative example of a device according to one or more embodiments of the invention.

DETAILED DESCRIPTION OF THE INVENTION

Figure 1:
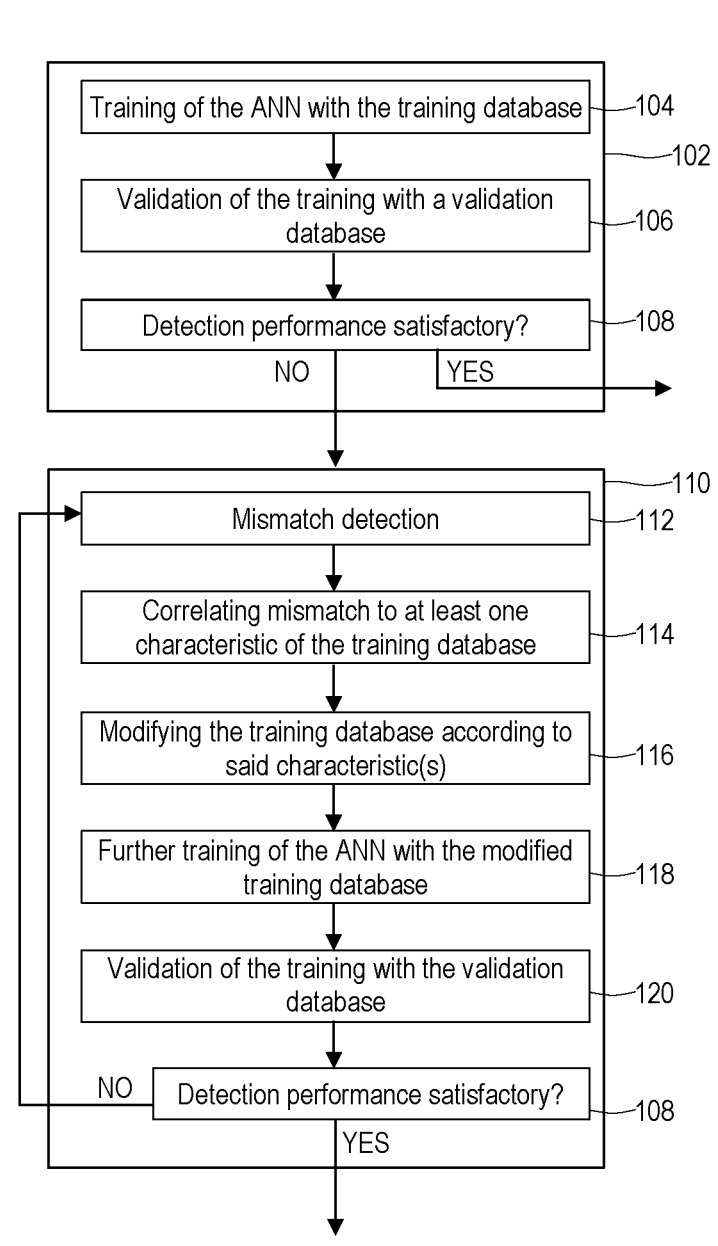
FIG. 1 is a diagrammatic representation of a non-limitative example of a method according to one or more embodiments of the invention.

It is well understood that the one or more embodiments that will be described below are in no way limitative. In particular, it is possible to imagine variants of the one or more embodiments of the invention comprising only a selection of the characteristics described hereinafter, in isolation from the other characteristics described, if this selection of characteristics is sufficient to confer a technical advantage or to differentiate the invention with respect to the state of the prior art. Such a selection comprises at least one, preferably functional, characteristic without structural details, or with only a part of the structural details if this part alone is sufficient to confer a technical advantage or to differentiate the one or more embodiments of the invention with respect to the prior art.

In the FIGURES, elements common to several figures retain the same reference.

FIG. 1 is a diagrammatic representation of a non-limitative example of a method according to one or more embodiments of the invention.

The method 100, shown in FIG. 1, may be used for example for training an ANN for detecting objects in images such as vehicles, humans, etc. In the following, without loss of generality, it is considered that the method 100 is used for detecting vehicles in images, such as land vehicles. The land vehicles to be detected may be limited to cars, buses and trucks.

The ANN may for example be a DLCNN, or any other ANN for object detection in images.

The method 100 of FIG. 1 comprises a training phase 102 for training the ANN with a training database comprising several training images, for example 2000 images.

The training phase 102 comprises a training step 104 for training the ANN. The training of the ANN may be done in a conventional way by entering each training image into the ANN, and comparing the output of the ANN to the expected result, i.e. a label of the image indicating the location of each object in said training image and if the ANN is trained to detect different types of objects, also a tag of the image indicating the type of the land vehicle in said training image. An error may be calculated for each training image and a global error may be computed for all training images. The weights of the ANN may be updated as a function of the global error, for example by backpropagation. This operation may be repeated until the global error of the ANN doesn't decrease any more for several iterations of training.

The trained ANN may then be tested, during a step 106, with a validation database containing validation images. The detection performance of the ANN, with the validation database, may be calculated, for example as a percentage of the validation images for which the ANN outputs a correct result for object detection.

During a step 108, the performance of the ANN, obtained at the validation step 106 may be compared to a predetermined threshold. If the performance is equal to, or greater than, the threshold, the ANN is well trained and the method 100 is stopped.

Otherwise, by way of at least one embodiment, the method 100 comprises a phase 110, called enhancing phase for improving the performance of the ANN.

The enhancing phase 110 comprises a step 112 for detecting a mismatch between the validation images and the output of the ANN for the validation images. The mismatch detection may be done in different ways.

According to at least one embodiment, for at least one validation image, the mismatch may be detected by comparing a label of said validation image to a feature detected in said validation image by an algorithm, such as a heatmap algorithm, or a gradient based algorithm. More specifically, the validation image is entered to the algorithm and the later detects the key feature(s) in the validation image, for example by a detection of color change or by contour detection. Then the position of the key feature(s) is compared to the label(s) of the validation image. If the key feature is not in the label of the validation image, there is a mismatch. Of course, other key feature detection techniques may be used and the invention is not limited to the examples given above.

The enhancing phase 110 comprises a step 114 for correlating the mismatch to a characteristic relative to the training image that impairs the performance of the trained ANN, also called impacting characteristic. This correlating step 114 is a very advantageous step because it gives an explanation of why the training of the ANN was not satisfactory.

The correlating step 114 may be done in various ways. According to at least one embodiment, the correlating step 114 may be done by analyzing the descriptors of the training images, such as the label(s) and/or the tag(s) and/or the metadata, associated to the training images, and more specifically by determining a count of the words appearing in the descriptors of the training images. If a specific word appears too frequently in the descriptors of the training images, that means that the training images are focused too much on a specific feature, and images that does not contain this feature will not be treated satisfactorily by the trained ANN during object detection.

For example, by way of one or more embodiments, if the objects to be detected are "land vehicles", and if the word "snow" appears too frequently in the metadata of the training images, this means that the training images are too focused on vehicles appearing in snowy weather, and the training database should be modified to integrate images of vehicles shown in other weather conditions than snowy weather. The same applies to the tags and the labels of the training images.

The correlating step 114 outputs at least one characteristic, relative to the training images, and that explains why the training of the ANN was not satisfactory in the validation images.

The enhancing phase 110 comprises a step 116 for modifying the training database, according to the characteristic(s) identified at the correlating step 114.

The database modification step 116 may comprise the selection of a subset of images in the initial training database.

Alternatively, or in addition, by way of at least one embodiment, the database modification step 116 may comprise adding at least one new training image into the initial training database. The new training image may be a real image captured by imaging means, such as a camera, from a real environment. The new training image may be a synthetic image generated by simulation, and more specifically by 3D-simulation. A non-limitative example of such a synthetic image generation method is described below with reference to the FIG. 2, according to one or more embodiments of the invention.

Thus, the step 116 outputs a modified training database.

The enhancing phase 110 comprises a step 118 for further training the ANN with the modified training database. The training of the ANN may be done similarly to the training step 104 described above, but this time with the modified training database.

The enhancing phase 110 comprises a step 120 for testing, on the validation database, the ANN trained at step 118, similarly to step 106.

At the step 122, the performance, i.e. the detection accuracy, of the trained ANN on the validation database is measured and compared to the predetermined threshold, similarly to step 108. If the performance is equal to, or greater than, the threshold, the ANN is well trained and the method 100 is stopped. Otherwise another iteration of the enhancing phase 120 may be carried out.

FIG. 2 is a diagrammatic representation of a non-limitative example of a method for generating an image by simulation, that may be implemented in one or more embodiments of the invention for generating training images.

The method 200, shown in FIG. 2, may be used for generating a training image for training an ANN for detecting any type of objects, such as land vehicles.

The method 200 may be carried out during the step 116 of the method 100 of FIG. 1 for generating new training image(s) that are added to the training database.

Alternatively, or in addition, by way of at least one embodiment, the method 200 may also be carried out before the method 100 for generating training images in order to constitute the training database used at step 104 for training the ANN.

The method 200 comprises a step 202 for obtaining a 3D-model of an object to be detected. If the object to be detected in images is a land vehicle, for example a bus, the step 202 is carried out for obtaining a 3D-model of a bus. The 3D model of the object may be read from a database storing such a 3D-model. Such a 3D-model may be obtained from a 3D-imaging camera imaging a real object. Such a 3D-model may also be designed by a user through a design software, for example at the time the object is designed.

During a step 204 an environment image is obtained. The environment image may be a real image, or may be simulated. It may be a computer created environment. The environment image may be read from a database storing said environment image. For example, an object may be put in a simulated environment, e.g. a city, and a camera may be moved around the object to collect images.

In a step 206, the 3D-model of the object is added to the environment image so that the environment image forms the background of the 3D-model.

At a step 208 different features may be applied to the 3D-model in order to adjust at least one imaging condition of the object in the training image, such as:

a size of the object,
    an orientation of the object,
    a color of the object,
    a point of view of the object,
    a distance to the object,
    etc.

in the image that is being generated.

All these adjustments may be done according to input parameters entered by a user, and/or according to at least one characteristic output for example by the correlating step 114. The image thus obtained is stored as a training image. The image thus obtained, with the 3D model of the object superimposed on the environment image, may be a segmentation image.

The method 200 may also comprise an optional step 210 adding, or associating, a label to the training image, according to at least one embodiment of the invention. Indeed, since the object was placed in/on the environment image at step 206, and optionally adjusted at step 208, its location in the image is known. Plus, the size of the object is also known because the size of the 3D-model of the object is known, and was optionally adjusted at step 208. Thus a label, i.e. a bounding box, indicating the position of the object in the new image is also known and may be associated to the new image, automatically.

The method 200 may also comprise an optional step 212 adding, or associating a tag to the new image, by way of at least one embodiment. Indeed, since the nature of the object is known, it may be added to the training image.

The method 200 may also comprise an optional step 214 adding, or associating, at least one metadata to the training image, for describing an environment, or an imaging condition, of the object in said training image, by way of at least one embodiment. At least one metadata may indicate at least one information about the environment shown in the training image such as the weather, the daytime, the type of the ground shown in the image when applicable, etc. All this information is known because they are in, and associated to, the environment image chosen at step 204. Moreover, at least one metadata may indicate at least one information about the imaging condition of the object in the training image, such as the distance to the object in the training image, the orientation of the object in the training image, etc. All this information is also known because they were applied to the 3D-model of the object at step 208.

At step 216 the training image as well as the descriptor(s) of the training image, i.e. at least one tag, and/or at least one label and/or at least one metadata, are stored.

The method 200 may be repeated as many times as desired in order to generate simulated training images by changing the object to be detected, and/or an environment shown in the environment image, and/or at least one imaging condition of the object. Thus, it is possible to generate, by simulation, as many training images as needed, in a very short time and in a convenient manner.

FIG. 3 is a diagrammatic representation of a non-limitative example of a device for training an ANN for object detection in images, according to one or more embodiments of the invention.

The device 300, shown in FIG. 3, may be used for training an ANN for detecting any type of objects, such as land vehicles.

The device 300 may be used to carry out a method according to the invention, and more particularly the method 100 of FIG. 1, according to one or more embodiments of the invention.

The ANN trained by the device 300 according to the invention may be any type of ANN used for object detection in images, such as a DLCNN.

The device 300 comprises a training module 302 for training the ANN with a training database TDB comprising many training images, such as several thousands of training images. The training module 302 may, without loss of generality, be configured to carry out the training step 104 and the further training step 118 of the method 100.

The device 300 comprises a validation module 304 for validating the training of the ANN with a validation database VDB comprising many validation images, such as several dozens of validation images. The validation module 304 may, without loss of generality, be configured to carry out the validation step 106 and the validation step 120 of the method 100, according to one or more embodiments of the invention.

The device 300 also comprises an enhancing module 310.

The enhancing module 310 comprises a mismatch detection module 312 configured to detect a mismatch between the validation images and a response of the trained ANN in response to the validation images in the validation database VDB. The mismatch detection module 312 may, without loss of generality, be configured to carry out the mismatch detection step 112 of the method 100.

The enhancing module 310 also comprises a correlation module 314 configured to correlate the detected mismatch(es) to at least one characteristic of the training database TDB. Without loss of generality, the correlation module 314 may be configured to carry out the correlation step 114 of the method 100.

The enhancing module 310 further comprises a modification module 316 configured to modify the training database TDB, according to at least one characteristic identified by the correlation module 314. The modification module 316 may, for example, be configured to:

select a subset of images in the training database TDB, and/or
    add at least one training image to the training database; and, optionally, generate a simulated new training image.

Without loss of generality, the modification module 316 may be configured to carry out the modification step 116, according to one or more embodiments of the invention. As indicated above, step 116 may comprise new training images generated by simulation, for example by carrying out the method 200 of FIG. 2, according to one or more embodiments of the invention. In this case, the modification module 316 may also be configured to carry out the method 200 for generating synthetic training image(s) by simulation.

At least one of the modules of the device 300 described with reference to FIG. 3, and more generally at least one of the modules of the device according to one or more embodiments of the invention, may be an independent module separated from the other modules.

At least two of the modules may be integrated into a common module.

At least one of the modules may be a software, such as a computer program, an application, etc.

At least one of the modules may be a hardware component, such as a processor, a chip, a smartphone, a tablet, a computer, a server, etc.

At least one of the modules may be a combination of at least one software and at least one hardware component.

Of course, the one or more embodiments of the invention are not limited to the examples detailed above.

The invention claimed is:

1. A method for training an artificial neural network (ANN) for object detection in images, said method configured to be implemented by a computer, and said method comprising:

a training phase that comprises training the ANN with a training database (TDB) comprising training images, and measuring a performance of the ANN that is trained with a validation database (VDB) comprising validation images;

wherein if the performance that is measured is not satisfactory, implementing an enhancing phase comprising detecting a mismatch between the validation images and a response of the ANN that is trained in response to said validation images, correlating the mismatch that is detected to at least one characteristic of the training images that impacts the training of the ANN, modifying the training database (TDB) according to said at least one characteristic of the training images that impacts the training of the ANN, and training the ANN with said training database that is modified;

wherein said correlating the mismatch comprises correlating said mismatch to at least one metadata, associated to said training images, and describing an environment, or an imaging condition, of an object to be detected in said training images.

2. The method according to claim 1, wherein, for a validation image of the validation images, the mismatch is detected by comparing a label of said validation image to a feature detected in said validation image by a predetermined algorithm.

3. The method according to claim 2, wherein the predetermined algorithm is a heatmap algorithm, or a gradient based algorithm.

4. The method according to claim 1, wherein said modifying the training database (TDB) comprises adding at least one new training image to said training database.

5. The method according to claim 4, further comprising generating the at least one new training image by 3D-simulation.

6. The method according to claim 4, further comprising automatically adding, to the at least one new training image, a label indicating a location of an object to be detected in said at least one new training image.

7. The method according to claim 4, further comprising automatically adding, to the at least one new training image, a tag indicating a type of an object to be detected in said at least one new training image.

8. The method according to claim 1, wherein said modifying the training database comprises selecting a subset of said training database (TDB).

9. The method according to claim 1, wherein the training database comprises at least one training image, comprising a synthetic training image, obtained by simulation; and optionally, at least one real image captured by imaging means.

10. A non-transitory computer program comprising instructions which, when executed by a computer, cause the computer to carry out a method for training an artificial neural network (ANN) for object detection in images, said method configured to be implemented by a computer, and said method comprising:

a training phase that comprises training the ANN with a training database (TDB) comprising training images, and measuring a performance of the ANN that is trained with a validation database (VDB) comprising validation images;

wherein if the performance that is measured is not satisfactory, implementing an enhancing phase comprising detecting a mismatch between the validation images and a response of the ANN that is trained in response to said validation images, correlating the mismatch that is detected to at least one characteristic of the training images that impacts the training of the ANN, modifying the training database (TDB) according to said at least one characteristic of the training images that impacts the training of the ANN, and training the ANN with said training database that is modified;

wherein said correlating the mismatch comprises correlating said mismatch to at least one metadata, associated to said training images, and describing an environment, or an imaging condition, of an object to be detected in said training images.

11. A device comprising:

one or more of at least one software component, and at least one hardware component configured to implement a method for training an artificial neural network (ANN) for object detection in images, said method comprising a training phase that comprises training the ANN with a training database (TDB) comprising training images, and measuring a performance of the ANN that is trained with a validation database (VDB) comprising validation images;

wherein if the performance that is measured is not satisfactory, implementing an enhancing phase comprising detecting a mismatch between the validation images and a response of the ANN that is trained in response to said validation images, correlating the mismatch that is detected to at least one characteristic of the training images that impacts the training of the ANN, modifying the training database (TDB) according to said at least one characteristic of the training images that impacts the training of the ANN, and training the ANN with said training database that is modified;

wherein said correlating the mismatch comprises correlating said mismatch to at least one metadata, associated to said training images, and describing an environment, or an imaging condition, of an object to be detected in said training images.

* * * * *